(12) United States Patent
Gershman

(10) Patent No.: US 8,112,469 B1
(45) Date of Patent: Feb. 7, 2012

(54) EMERGENCY OVERRIDE SYSTEM AND METHOD FOR NETWORK DEVICES

(75) Inventor: Vladimir Gershman, Holland, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 351 days.

(21) Appl. No.: 12/395,869

(22) Filed: Mar. 2, 2009

(51) Int. Cl.
*G06F 15/16* (2006.01)

(52) U.S. Cl. ....... 709/200; 361/1; 340/286.04; 340/500; 340/593

(58) Field of Classification Search ................ 709/200; 361/1; 340/286.04, 500, 593; 455/340; 714/100
See application file for complete search history.

(56) References Cited

U.S. PATENT DOCUMENTS

| | | | |
|---|---|---|---|
| 5,349,644 A * | 9/1994 | Massey et al. | 706/10 |
| 5,441,411 A * | 8/1995 | Hasse | 434/34 |
| 5,634,793 A * | 6/1997 | Hasse | 434/34 |
| 6,172,428 B1 * | 1/2001 | Jordan | 290/40 C |
| 7,158,359 B2 * | 1/2007 | Bertele et al. | 361/93.9 |
| 7,791,853 B2 * | 9/2010 | Ohshima | 361/93.1 |
| 7,814,339 B2 * | 10/2010 | Monferrer et al. | 713/300 |
| 7,839,201 B2 * | 11/2010 | Jacobson | 327/513 |
| 8,025,437 B2 * | 9/2011 | Johnson, Jr. | 374/152 |
| 2002/0069259 A1 * | 6/2002 | Kushwaha et al. | 709/217 |
| 2003/0058593 A1 * | 3/2003 | Bertele et al. | 361/63 |
| 2005/0184715 A1 * | 8/2005 | Kidokoro et al. | 323/282 |
| 2006/0007626 A1 * | 1/2006 | Ohshima | 361/143 |
| 2006/0012928 A1 * | 1/2006 | Theiler | 361/85 |
| 2006/0221527 A1 * | 10/2006 | Jacobson | 361/100 |
| 2006/0277301 A1 * | 12/2006 | Takanashi et al. | 709/225 |
| 2007/0080716 A1 * | 4/2007 | Strangfeld et al. | 326/83 |
| 2008/0072086 A1 * | 3/2008 | Kim | 713/323 |
| 2008/0172744 A1 * | 7/2008 | Schmidt et al. | 726/26 |
| 2009/0059457 A1 * | 3/2009 | Morimoto | 361/93.1 |
| 2009/0296291 A1 * | 12/2009 | Volke | 361/56 |

* cited by examiner

*Primary Examiner* — Abdullahi Salad
*Assistant Examiner* — Jimmy H Tran
(74) *Attorney, Agent, or Firm* — Howard IP Law Group

(57) ABSTRACT

An emergency override system includes first and second communication interfaces, a sensor, and a processor. The first communication interface is connected to the second communication interface by a communication line. The sensor is disposed along the communication line and is configured to output signals in response to sensing network data being transmitted on the communication line. The switch is disposed along the communication line and has an open configuration and a closed configuration. The processor is coupled to the switch and the sensor and is configured to control the opening and closing of the switch in response to the signals transmitted by the sensor. The processor provides device control data to the network device over the communication line when the switch is open. The network control data commands the network device to perform a predetermined function in response to a lack of network data being transmitted on the communication line.

19 Claims, 4 Drawing Sheets

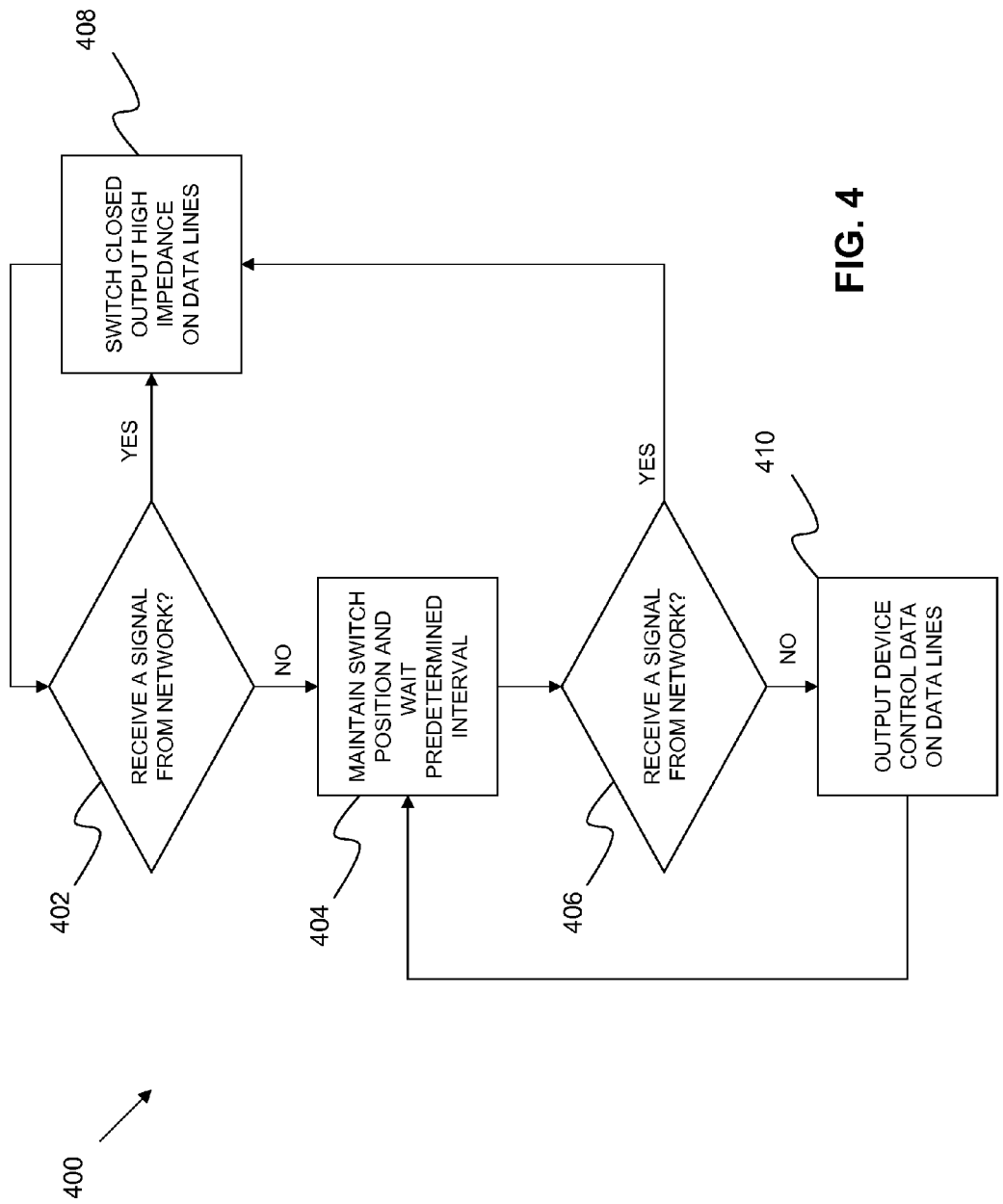

EMERGENCY OVERRIDE SYSTEM AND METHOD FOR NETWORK DEVICES

FIELD OF DISCLOSURE

The disclosed system and method relate to network devices, and more specifically, the disclosed system and method relate to emergency control devices for network devices.

BACKGROUND

Military networks include devices such as network switches that may be configured with a battleshort mode in which the network device is prohibited from shutting down even if it detects an over-temperature condition during a battle situation. Once the battle situation is over, a command station sends the network device simple network management protocol (SNMP) messages or commands over the network instructing the network device to exit battleshort mode and begin tracking over-temperature conditions to avoid destruction caused by a burnout. However, conventional military network devices are susceptible to damage during failed network conditions as the network devices will not receive the SNMP messages from the command station inevitably leading to the failure and destruction of the equipment.

Attempts to solve this problem include transmitting an audio alarm or a signal that causes a graphical user interface (GUI) on a computer located at the command station to be displayed. A user operating the computer at the command station receives the alarm and then deploys personnel to locate the faulty network device and manually shut it down. However, some equipment may burnout in as little as five to ten minutes, which in some situations does not enable personnel to locate and shutdown the equipment.

Accordingly, an improved system and method for preventing equipment burnout after a battleshort condition is desirable.

SUMMARY

In some embodiments, an emergency override system includes first and second communication interfaces, a network interface, a sensor, and a processor. The first communication interface is connected to the second communication interface by a communication line. The sensor is disposed along the communication line and is configured to output signals in response to sensing network data being transmitted on the communication line. The switch is disposed along the communication line and has an open configuration and a closed configuration. The processor is coupled to the switch and the sensor and is configured to control the opening and closing of the switch in response to the signals transmitted by the sensor.

In some embodiments, a method comprises determining if network data is being transmitted over a communication line, outputting a high impedance to the communication line if network data is being transmitted over the communication line, and opening a switch and outputting device control data to the communication data line if data is not being transmitted on the communication line. The communication line is disposed between a first communication interface connected to the network device and a second communication interface connected to a network.

In some embodiments, a machine readable storage medium is encoded with program code, wherein when the program code is executed by a processor, the processor performs a method. The method comprises determining if network data is being transmitted over a communication line, outputting a high impedance to the communication line if network data is being transmitted over the communication line, and opening a switch and outputting device control data to the communication data line if data is not being transmitted on the communication line. The communication line is disposed between a first communication interface connected to the network device and a second communication interface connected to a network.

BRIEF DESCRIPTION OF THE DRAWINGS

FIG. 4 is a flow diagram of a state machine in accordance with the emergency override device illustrated in FIG. 2.

DETAILED DESCRIPTION

Figure 1A:
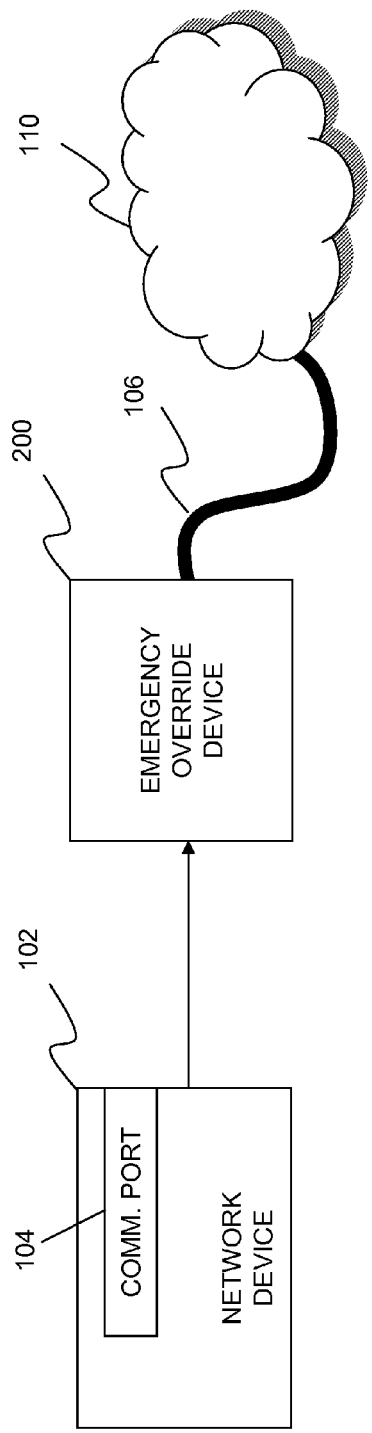
FIG. 1 is a block diagram of an emergency override device connected to a network device.
Figure 1B:
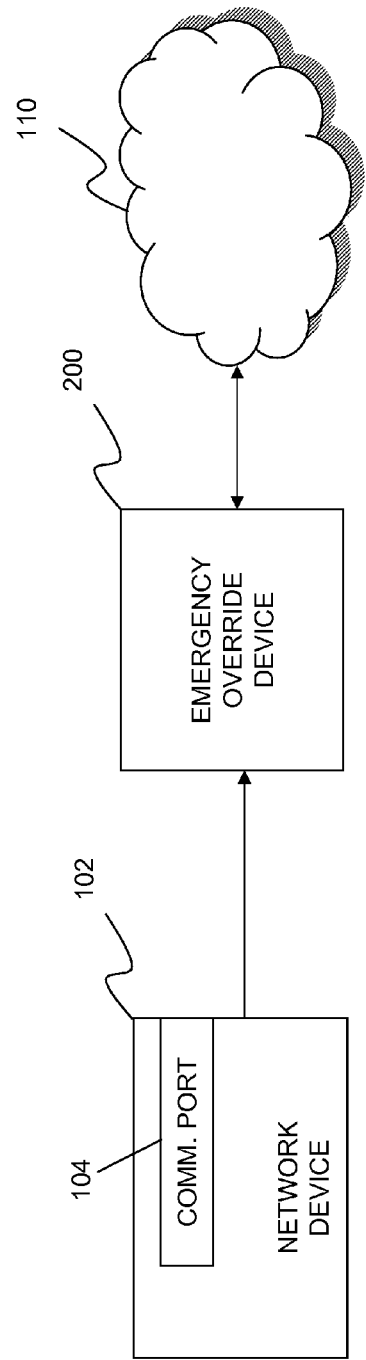

FIG. 1A illustrates a wired network implementation of an emergency override device (EOD) 200 that may be installed or connected to a network device 102. As shown in FIG. 1A, EOD 200 is connected to a network device 102 through a communication port 104 of network device 102. Network device 102 may be a network switch, computer, server, or any device that may be connected to a network 110. Communication port 104 may be any port through which network device 102 may connect to a network 110. Network 110 may be a local area network (LAN), wide area network (WAN), personal area network (PAN), the Internet, or the like. EOD 200 is connected to the network via network cable 106. FIG. 1B illustrates a wireless network implementation of an EOD 200 connected to a network device 102. As shown in FIG. 1B, EOD is connected to network device 102 through communication port 104. EOD 200 is also wirelessly connected to network 110 as described below.

Figure 2:
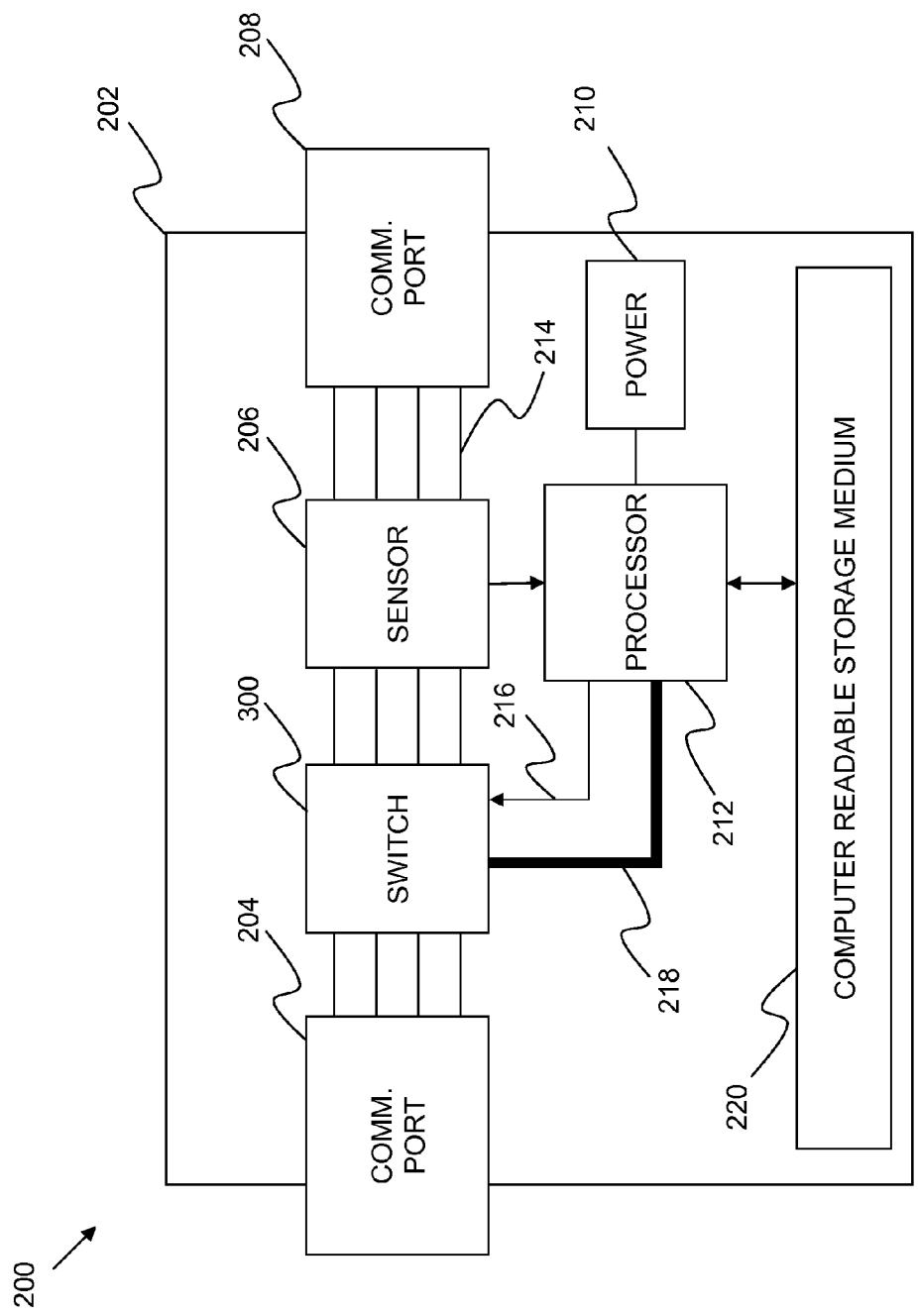
FIG. 2 is a block diagram of one embodiment of an emergency override device as shown in FIG. 1.

FIG. 2 is a block diagram of one architecture of a EOD 200. As shown in FIG. 2, EOD 200 may be disposed on a printed circuit board (PCB) 202 and include a first communication interface 204 connected to a switch 300. Switch 300 is connected to a sensor 206 and a processor 212. Sensor 206 is connected to processor 212 and a second communication interface 208. Processor 212 may be connected to a power source 210 and a computer readable storage medium 220.

The first communication interface 204 may be any plug or receptacle that may be connected to a communication port 104 of network device 102. Examples of the first communication interface 204 include, but are not limited to, an RJ-45 (Ethernet) plug or receptacle, an RJ-11 (phone) plug or receptacle, a universal serial bus (USB) plug or socket, or the like. Second communication interface 208 may be any network plug or socket including, but not limited to an RJ-45 (Ethernet) plug or receptacle, an RJ-11 (phone) plug or receptacle, a universal serial bus (USB) plug or socket, wireless network interface (e.g., a wireless network card), or the like. In some embodiments, the first and second communication interfaces 204, 208 are complementary with one another. For example, if the first communication interface 204 is an RJ-45 plug, then the second communication interface 208 may be an RJ-45 plug or receptacle, or a wireless network card so that the data transmitted from network device 102 to network 110 may be properly transmitted.

Sensor 206 is configured to determine if network data is being transmitted over traces 214. In some embodiments, sensor 206 may be a Hall-effect device or other device configured to detect current flowing from network interface 208 to switch 300 through traces 214. In some embodiments, sensor 206 is configured to detect a voltage above a threshold value on traces 214. For example, sensor 206 may be a comparator configured to compare a voltage received on traces 214 with a reference voltage. Sensor 206 may be configured to output a signal to processor 212 that corresponds to whether network data is being transmitted through traces 214. For example, sensor 206 may output a logic one if network data is being transmitted through traces 214 or a logic zero if network data is not being transmitted. One skilled in the art will understand that sensor 206 may be output other signals in response to sensing network data being transmitted through traces 214.

Processor 212 may be any processor, central processing unit (CPU), microprocessor, micro-controller, or like computational device. Processor 212 is powered by power supply 210 and is configured to control the opening and closing of switch 300 based on the signal received from sensor 206. For example, processor 212 may be configured to receive a signal from sensor 206 identifying that network data is being transmitted traces 214. If sensor 206 transmits a signal to processor 212 identifying that network data is being transmitted over traces 214, then processor 212 may maintain switch 300 in a closed orientation and a high impedance on data lines 218 so as to not interfere with the network data being transmitted along traces 214.

Alternatively, if sensor 206 identifies that network data is not being transmitted over traces 214, then processor 212 may open switch 300 and output device control data on data lines 218. The device control data which processor 212 outputs on data lines 218 may command network device 102 to perform certain functions as a result of losing its connection to network 110. For example, network device 102 may be a network switch that was previously instructed to enter a battleshort mode in which it will ignore over-heat signals. Accordingly, if the network switch 102 loses its connection to the network, processor 212 may instruct network switch 102 to exit battleshort mode and to monitor over-heating conditions to prevent device failure. One skilled in the art will understand that the EOD 200 may be connected to a variety of network devices to ensure safety or security functions in the event of a network failure. For example, EOD 200 may be connected to a computer A computer readable storage medium 220 may be connected to processor 212. Computer readable storage medium may be a read only memory (ROM), a random access memory (RAM), flash memory, or the like. Examples of ROMs include, but are not limited to, programmable read only memory (PROM), erasable programmable read only memory (EPROM), and electrically erasable programmable read only memory (EEPROM). Examples of RAMs include, but are not limited to, dynamic random access memory (DRAM) and static random access memory (SRAM). Computer readable storage medium 220 may store firmware, assembly language, or other code that may be executed by processor 212.

Figure 3:
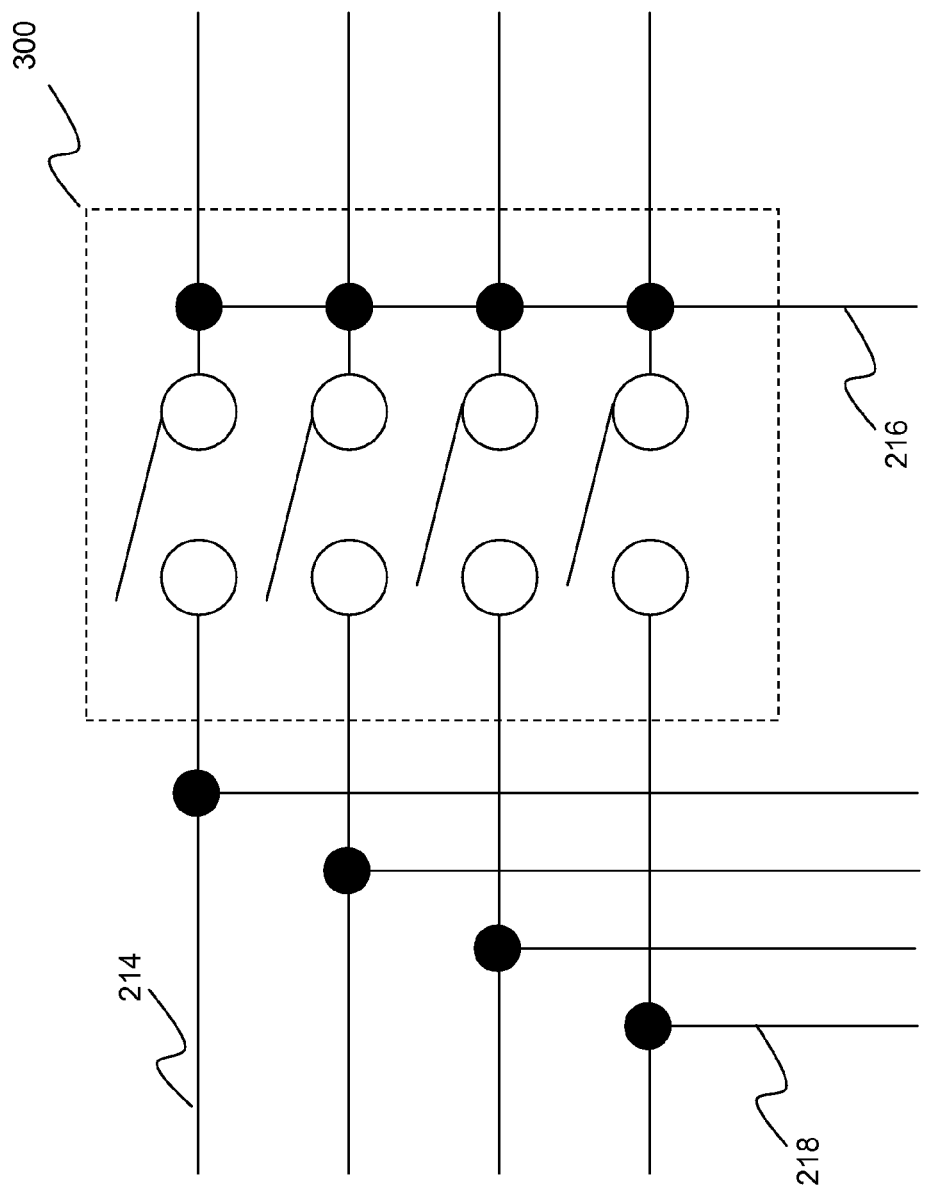
FIG. 3 is one example of a connection between a switch and a processor in accordance with the emergency override device illustrated in FIG. 2.

FIG. 3 illustrates one possible connection between switch 300 and processor 212. As shown in FIG. 3, switch 300 is connected to each of the traces 214. With switch 300 closed, data may be transmitted on traces 214 between the equipment or system and a controller. In some embodiments, switch 300 may include semiconductor switches that may be controlled by a switch control signal transmitted over switch control line 216 from processor 212. Data lines 218 may connect processor 212 to each of the traces 214 to enable processor 212 to output device control data to network device 102 over traces 214. The device control data may be in the form of SNMP, telecommunication network (Telnet) protocol, secure shell (SSH) protocol, internet protocol (IP), or the like.

FIG. 4 is a block diagram of one embodiment of a state machine of processor 212. In some embodiments, switch 300 is initially in a closed orientation so that network data from network 110 may be transmitted to network device 102. At decision block 402, processor 212 determines if network data is being transmitted over traces 214 by receiving a signal from sensor 206. If sensor 206 is outputting a signal identifying that network data is being transmitted between network 110 and network device 102, e.g., current or voltage is being sensed on traces 214, then processor 212 may output a high impedance on data lines 218 at block 408.

If sensor is outputting a signal identifying that network data is not being transferred between network 110 and network device 102, e.g., there is no current or voltage being sensed on traces 214, then processor may maintain the position of switch 300 and wait a predetermined time interval at block 404. The predetermined time interval is selected to take into account that network data may not be constantly transmitted over traces 214. The predetermined time interval may be set at a few milliseconds to several seconds.

At decision block 406, processor 212 will again determine if a signal identifying that network data is being transmitted between network 110 and network device 102 has been received from sensor 206. If sensor 206 sends a signal identifying that network data is being transmitted on traces 214, then processor 212 will move to block 408 where it will maintain the switch 300 in a closed orientation and output a high impedance on data lines 218. However, if a signal from sensor 206 is received by processor 212 identifying that network data is not being transmitted over traces 214, then at block 410 processor 212 will open switch 300 and output device control data on data lines 218. As described above, the device control data may be in accordance with one of a variety of protocols (e.g., SNMP, Telnet protocol, SSH protocol, IP protocol, or the like) and command network device 102 to perform a predetermined function such as monitor over-temperature conditions, erase data on a hard drive, power the network device 102 to a reduced power or off state, or the like.

The state machine will move from block 410 back to block 404 where the processor 212 maintains switch 300 in the current orientation and waits for the predetermined time period before moving to block 406 and determining if network data is being transmitted. In this manner, processor 212 will repeatedly check if data is being transmitted over the network 110 and open and close the switch 300 accordingly.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. An emergency override system for a network device, comprising:
 a first communication interface configured to be connected to the network device;
 a second communication interface connected to the first communication interface by a communication line, the second communication interface configured to connect the emergency override system and the network device to a network;

a sensor disposed along the communication line, the sensor configured to detect network data being transmitted on the communication line; wherein the sensor is configured to output a signal indicative of at least one of the presence and absence of network data being transmitted on the communication line;

a switch disposed along the communication line, the switch having an open configuration that prevents network data on the communication line from being transmitted to the first communication interface and a closed configuration that passes network data on the communication line to the first communication interface; and a processor coupled to the switch and the sensor, the processor configured to:
determine if network data is present on the communication line by monitoring the output of the sensor;
control the opening and closing of the switch based on said determination of the presence or absence of network data on the communication line; and
provide device control data to the network device over the communication line when it is determined that network data is not present on the communication line and the switch is in the open configuration, wherein the device control data commands the network device to perform a predetermined function in response to a lack of network data being transmitted on the communication line.

2. The system of claim 1, wherein the processor is further configured to maintain the switch in the closed configuration when the sensor detects the transmission of network data along the communication line.

3. The system of claim 1, wherein the processor is further configured to transition the switch from the closed configuration to the open configuration when the sensor does not detect the transmission of network data along the communication line.

4. The system of claim 1, wherein the device control data commands the network device to monitor over-temperature conditions of the network device.

5. The system of claim 1, wherein the predetermined function is to transition to one of a reduced power or off state.

6. The system of claim 1, wherein the predetermined function is to transition from a battleshort state to a normal operating state of the network device.

7. A method of controlling a network device, comprising:
determining if network data is being transmitted over a communication line by monitoring the output of a sensor disposed along the communication line, the communication line disposed between a first communication interface and a second communication interface of an emergency override device, the emergency override device connected to the network device through the first communication interface;

opening a switch if it is determined that network data is not being transmitted on the communication line, the switch disposed along the communication line of the emergency override device, wherein the switch comprises an open configuration that prevents network data on the communication line from being transmitted to the first communication interface, and a closed configuration that passes network data on the communication line to the first communication interface; and outputting device control data to the network device by way of the communication line if it is determined that network data is not being transmitted on the communication line, wherein the device control data commands the network device to perform a predetermined function in response to a lack of network data being transmitted over the communication line.

8. The method of claim 7, wherein determining if network data is being transmitted on the transmission line includes: receiving a first signal from a sensor of the emergency override device, the sensor disposed along the communication line, the first signal being transmitted in response to network data being transmitted along the communication line.

9. The method of claim 8, wherein determining if network data is being transmitted on the transmission line further includes: waiting for a predetermined period of time; receiving a second signal from the sensor after waiting for the predetermined period of time; and determining that network data is being transmitted on the data line if one of the first and second signals identifies data being transmitted on the communication line.

10. The method of claim 7, wherein the predetermined function is to transition from a battleshort condition.

11. The method of claim 7, wherein the sensor is a Hall-effect device.

12. The method of claim 7, wherein the predetermined function is to transition to one of a reduced power or off state.

13. The method of claim 7, wherein the predetermined function is to erase a hard disk drive of the network device.

14. A non-transitory computer readable storage medium encoded with program code, wherein when the program code is executed by a processor, the processor performs a method, the method comprising:
determining if network data is being transmitted over a communication line by monitoring the output of a sensor disposed along the communication line, the communication line disposed between a first communication interface and a second communication interface of an emergency override device, the emergency override device connected to the network device through the first communication interface;

opening a switch if it is determined that network data is not being transmitted on the communication line, the switch disposed along the communication line of the emergency override device, wherein the switch comprises an open configuration that prevents network data on the communication line from being transmitted to the first communication interface, and a closed configuration that passes network data on the communication line to the first communication interface; and outputting device control data to the network device by way of the communication line if it is determined that network data is not being transmitted on the communication line, wherein the device control data commands the network device to perform a predetermined function in response to a lack of network data being transmitted over the communication line.

15. The non-transitory computer readable storage medium of claim 14, wherein determining if network data is being transmitted on the transmission line includes: receiving a first signal from a sensor of the emergency override device, the sensor disposed along the communication line, the first signal received in response to network data being transmitted along the communication line.

16. The non-transitory computer readable storage medium of claim 15, wherein determining if network data is being transmitted on the transmission line further includes: waiting for a predetermined period of time; receiving a second signal from the sensor after waiting for the predetermined period of time; and determining that network data is being transmitted on the data line if one of the first and second signals identifies network data being transmitted on the communication line.

17. The non-transitory computer readable storage medium claim 14, wherein the device control data commands the network device to monitor over-temperature conditions.

18. The non-transitory computer readable storage medium of claim 14, wherein the sensor is a Hall-effect device.

19. The non-transitory computer readable storage medium of claim 14, wherein the predetermined function is to transition from a battleshort state.

* * * * *